Feb. 16, 1960   J. S. SCHROEDER ET AL   2,924,971
HYDRAULIC CIRCUIT TESTER

Filed Nov. 28, 1956   5 Sheets-Sheet 1

INVENTORS.
John S. Schroeder
David Mitchell
Donald A. Stark
BY Webb, Mackey & Burden

THEIR ATTORNEYS

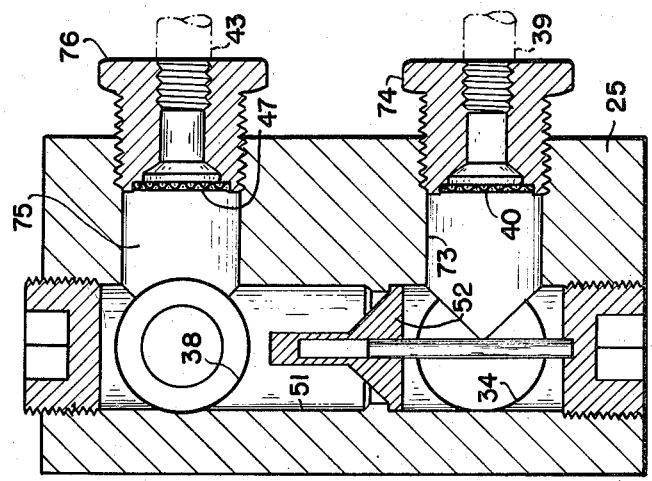
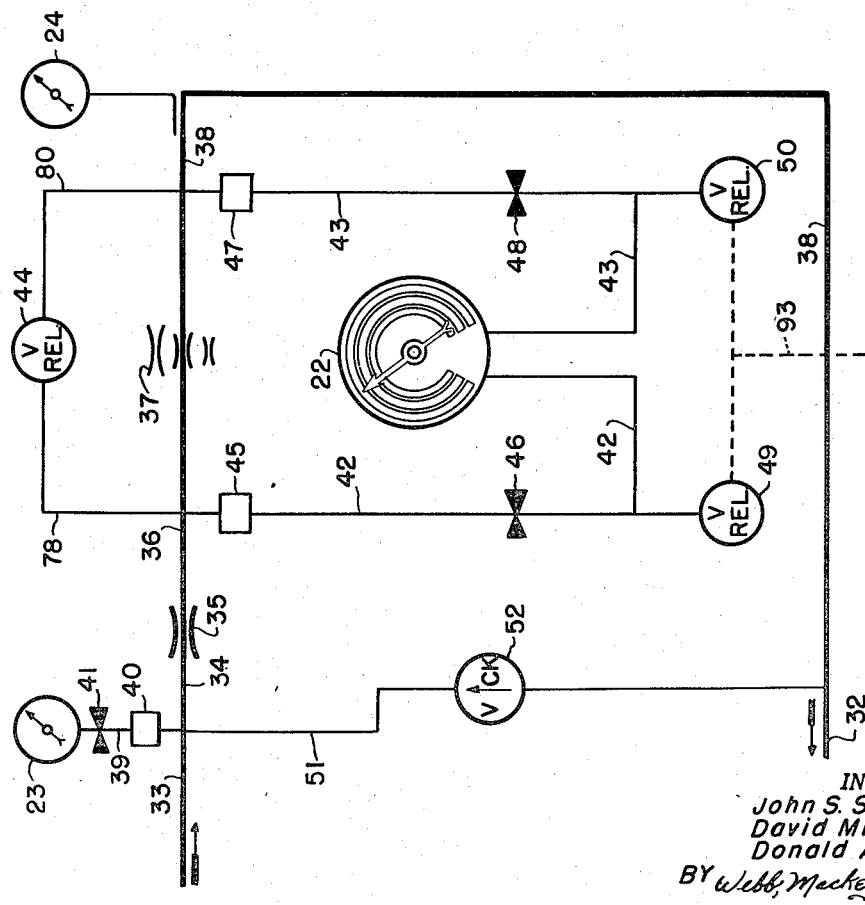

Feb. 16, 1960    J. S. SCHROEDER ET AL    2,924,971
HYDRAULIC CIRCUIT TESTER
Filed Nov. 28, 1956                                           5 Sheets-Sheet 4

INVENTORS,
John S. Schroeder
David Mitchell
Donald A. Stark
BY Webb, Mackey & Burden
THEIR ATTORNEYS Feb. 16, 1960

J. S. SCHROEDER ET AL 2,924,971

HYDRAULIC CIRCUIT TESTER

Filed Nov. 28, 1956

INVENTORS.
John S. Schroeder
David Mitchell
Donald A. Stark
BY Webb, Mackey & Burden
THEIR ATTORNEYS

United States Patent Office 2,924,971
Patented Feb. 16, 1960

2,924,971

HYDRAULIC CIRCUIT TESTER

John S. Schroeder, Edgeworth, Pa., David G. Mitchell, Sarasota, Fla., and Donald A. Stark, Willoughby Hills, Ohio, assignors to Schroeder Brothers Corporation, Pittsburgh, Pa., a corporation of Pennsylvania Application November 28, 1956, Serial No. 624,798

9 Claims. (Cl. 73—168)

This application relates to a hydraulic circuit tester, more specifically to a portable hydraulic circuit tester which is useful for measuring temperature, pressure, and flow from a port in any component in a hydraulic system.

It is frequently necessary to test components of a hydraulic system, such as pumps, valves, motors, etc., to determine the flow through the components under varying conditions of load and temperature. Heretofore such tests have generally been conducted by removing the component from the hydraulic system and taking it to a stationary test bench. Such an operation can be extremely laborious and time consuming. For example, one can readily appreciate the time and effort required to remove a hydraulic pump from a piece of coal mining equipment which is located down at the working face of the mine, to carry the component to a test bench on the surface, and to reinstall the component. There have been available so-called portable test benches, but these are simply conventional test benches on wheels and have been so large that they are impractical for many applications. While there has long been a demand for a small, lightweight portable hydraulic circuit tester, none has been available prior to our invention because of difficulties encountered in attempting to test hydraulic equipment at the place where it is being used.

Two factors have been largely responsible for the lack of portable hydraulic circuit testers. First, a portable test unit must necessarily use the hydraulic fluid which is being used in the hydraulic system tested. This fluid is invariably dirty and contains foreign particles which will clog the instruments used for testing. There are available relatively rugged hydraulic testing instruments, but even such instruments must be protected at least from dirt and foreign particles in the fluid. While filters can readily be provided for cleaning the fluid before it reaches a test instrument, the condition generally of oil in hydraulic equipment after it has been used even a relatively short period of time is such that filters used on the test instrument will clog very quickly unless filters are used of adequate size. Our unit is designed to measure large flow volumes (for example, 50 gallons a minute) and filters for this capacity would necessary be so large that the instrument would no longer be portable as a practical matter.

The second factor arises from the necessity of providing safety features on the unit in the event that the unit is improperly used by some workman, for example, if the instrument is connected to a source of greater flow than the instrument is designed to take. The instruments measure the difference in pressure between their point of connection into a system and atmosphere and, therefore, to be protected, they must be relieved to atmosphere. A truly portable test unit cannot have a reservoir. Obviously, the fluid cannot be dumped out on the ground and the return line of the system to which the instrument is connected cannot be relied upon to relieve the instrument. We have invented a portable hydraulic circuit tester which solves these problems. In our tester, the main flow of fluid from the unit being tested flows through a known orifice and is otherwise substantially unimpeded. Only a small volume of oil passes to the test instruments themselves, and this oil is cleaned by filter screens which are so located in the circuit tester as to be self-cleaning. By limiting flow in the dirt-sensitive circuits, we are also able to use smaller instruments and smaller sizes of other components, such as relief valves and tubing, so that the over-all space requirements of our portable hydraulic circuit tester are greatly reduced.

In the accompanying drawings, we have illustrated a presently preferred embodiment of our invention, in which:

Figure 3 is a flow diagram showing the circuits in our tester;

Figure 5 is a section along the lines V—V of Figure 4;

Figure 1:
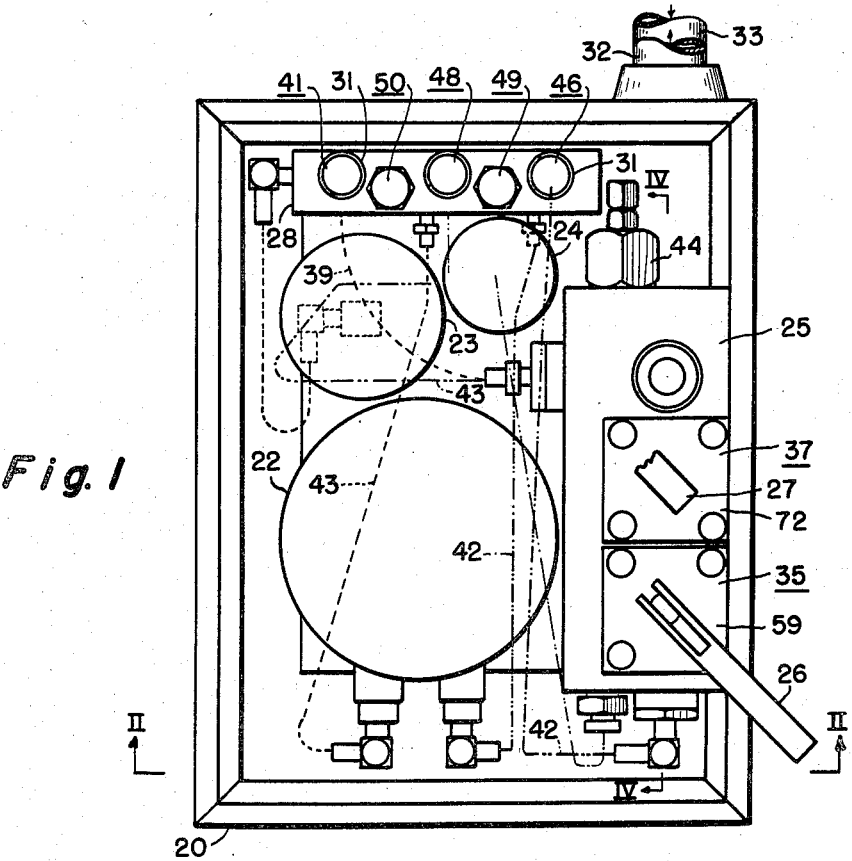
Figure 1 is a plan view of our circuit tester with certain portions removed for purposes of illustration.
Figure 2:
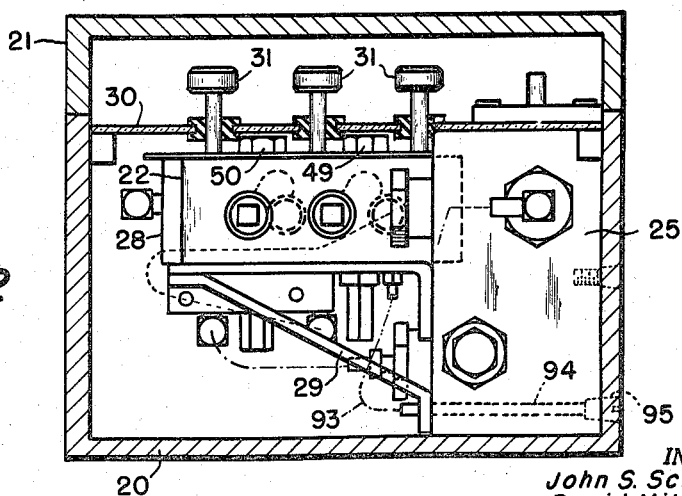
Figure 2 is a section along the lines II—II of Figure 1.

Referring to Figures 1 and 2, our portable circuit tester is mounted in a case 20 having a hinged cover 21 (the hinges not being shown). Within the case, there is a flow meter 22, which is a differential pressure gauge calibrated, however, to indicate flow in gallons per minute, a pressure gauge 23, and a temperature gauge 24. The case also has a main component block 25 in which are mounted, as will hereinafter be more fully explained, a manual variable loading valve, the operating handle 26 of which is shown in Figure 1, and a variable orifice having an operating handle 27. The orifice 37 can provide one of three openings so as to increase the range of the flow meter 22. Within the case, there is also an auxiliary block 28 in which are mounted snubbers and relief valves for the instruments.

As shown in Figures 1 and 2, the block 25 is secured to one side of the case 20 and the block 28 is mounted on a bracket 29 adjacent one end of the case. A plastic cover 30 extends the full width and length of the case above the blocks 25 and 28. Operating knobs 31 for the snubbers extend above the level of the cover and the cover has transparent portions over the dials of the flow meter, pressure gauge, and temperature gauge.

The circuit tester has two relatively large diameter pipes for connecting the circuit tester to the hydraulic component to be tested and to the reservoir of the circuit. Figure 1 shows the pipe 32 which is the outlet connection leading directly from the block 25, as will be hereinafter explained. A similar pipe is directly below the pipe 32 and provides an inlet connected directly to the block 25.

Figure 3 is a flow diagram showing the circuits in our hydraulic circuit tester. Fluid from the component to be tested enters the circuit tester through the inlet or pipe 33 and then passes directly to a passageway 34 in the main block 25 which leads to a manually operated loading valve 35. A passageway 36 in the main block leads to a manually variable orifice 37. From the orifice 37, the fluid flows in a passageway 38 in the main block directly to the outlet 32 which leads to the reservoir tank of the circuit having the component being tested.

The pressure gauge 23 is connected into the passageway 34 adjacent the inlet 33 by a small tube 39. At the point of connection of the tube 39 and the passageway 34, there is a filter screen 40 and between the screen and the gauge 23 there is a snubber 41.

At a point adjacent the passageway 38 downstream from the variable orifice 37, the temperature gauge 24 is inserted.

A small tube 42 is connected to the passageway 36 between the loading valve 35 and the orifice 37 and leads to the upstream side of the flow meter 22. A second tube 43 is connected into the passageway 38 on the downstream side of the orifice 37 and leads to the downstream side of the gauge 22. The gauge 22 is a differential pressure gauge which measures the pressure drop across the orifice 37 and, since the size of the orifice 37 is known, the gauge 22 can be marked to read directly in gallons per minute. The tubes 42 and 43 are much smaller in cross section than the passageways 34, 36, and 38 in the block and, therefore, provide passageways having much smaller flow capacity than the passageways 34, 36, and 38.

A relief valve 44 is connected across the gauge 22 and the orifice 37. This valve opens in the event that pressure drop across the orifice 37 is so large that damage to the gauge 22 might result.

The line 42 has a filter screen 45 and a snubber 46 between the passageway 36 and the gauge 22. The line 43 has a similar filter screen 47 and snubber 48. The lines 42 and 43 also have relief valves 49 and 50 which are connected into the lines between the snubbers 46 and 48 and the gauge 22. In the event of excessive pressure in the lines 42 and 43 because the relief valve 44 has not adequately relieved pressure, the relief valves 49 and 50 open to atmosphere.

Our circuit also has means for preventing damage to the circuit tester in the event that an operator reverses the connections to the instrument, that is, he connects the pressure outlet from the component being tested to the outlet in the circuit tester. The main block 25 has a passageway 51 which directly connects the inlet 33 and outlet 32 of the circuit tester. A check valve 52 is in the passageway 51 and permits flow from the outlet to the inlet but prevents flow from the inlet to the outlet through the passageway 51.

Figure 4:
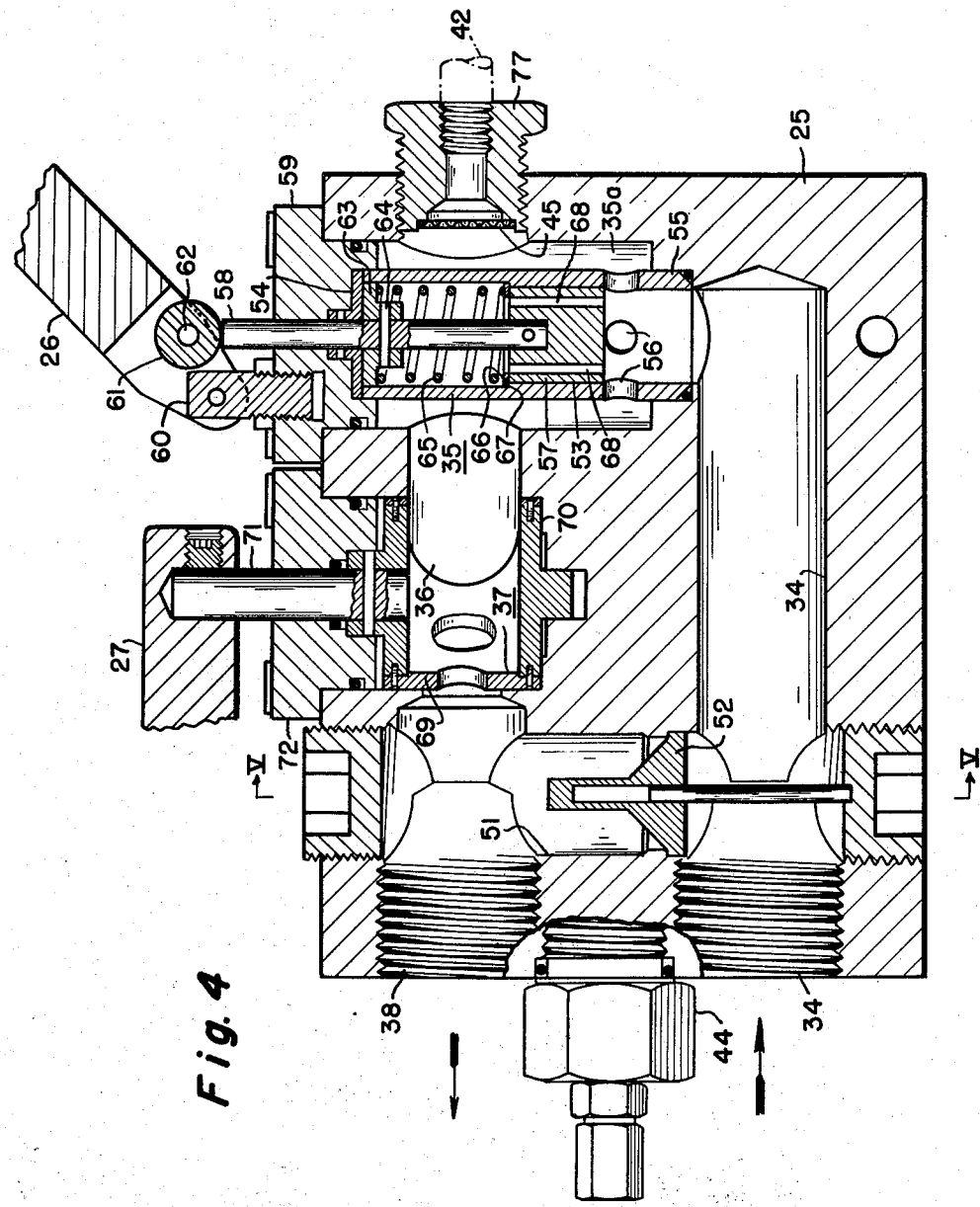
Figure 4 is a section along the lines IV—IV of Figure 1.
Figure 6:
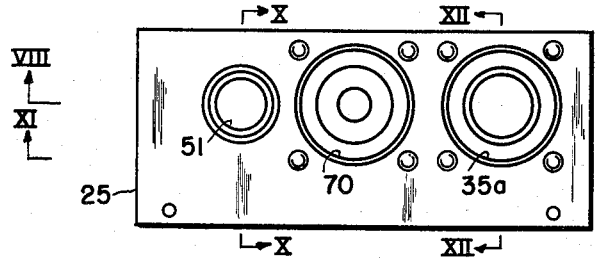
Figure 6 is a plan view of a block forming part of an orifice and loading valve assembly used in our tester.
Figure 7:
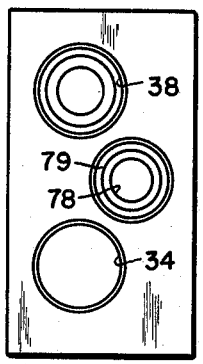
Figure 7 is a left-hand end view of the block shown in Figure 6.

Figures 4 and 5 show the construction of the main block 25 and of the components which it houses, the loading valve 35 and the variable orifice 37. The block has a horizontally extending passageway 34 which extends from one end of the block substantially the entire length of the block. This passageway 34 is threaded at its open end to receive a relatively large pipe (not shown) which forms the inlet to the tester. The passageway 34 leads to a vertically extending bore 35a for the valve 35. The valve comprises a sleeve 53 which is smaller in diameter than the main part of the bore 35a and which extends the full length of the bore. The sleeve is closed at its upper end by a cap 54. Its lower end fills a reduced portion 55 of the bore 35a. Above the reduced portion 55, the sleeve has ports 56 which may be opened and closed by a piston 57 which slides within the sleeve. The piston 57 is carried at the lower end of a rod 58 which extends through the cap 54 and a plug 59 which is bolted to the top of the block 25 and closes the upper end of the bore 35a. The operating handle 26 for the valve is pivoted adjacent one of its ends on a stud 60 which is threaded into the plug 59 and carries adjacent its pivot point a disc 61 which turns on a pin 62. The disc 61 is positioned on the handle 26 relative to the pivot point of the handle so that when the handle is pressed downwardly the disc 61 engages the rod 58 which in turn moves the piston 57 downwardly to restrict the flow through the ports 56. A manually variable load can thereby be applied to the hydraulic component being tested.

A washer 63 is secured to the rod 58 within and adjacent the top of the sleeve 53 by a pin 64 and a coil spring 65 presses against the washer 63 and a washer 66 which rests on a shoulder 67 formed in the sleeve 53. The spring 65, therefore, holds the valve in open position and the valve is closed by pressing downwardly on the handle 26 against the pressure of the spring. The piston 57 has passageways 68 extending through it so as to equalize the hydraulic pressure on the bottom of the piston.

Fluid flows from the valve 35 into the bore 35a and the passageway 36 and then into the variable orifice 37. Referring to Figure 4, it will be seen that this variable orifice is similar to a plug valve but that the plug portion 69 of the valve has three holes in its periphery of different diameters so that three different fixed orifices can be provided through which the fluid flows from the loading valve 35 through passageway 38 to the outlet 32. The plug 69 is seated in a bore 70 formed in the block 25 and is turned by a shaft 71 which extends through a plug 72 bolted to the block 25 for closing the bore 70 and carries the operating handle 27. Moving the handle 27 turns the plug 69 so that the fluid will flow through the desired orifice into the passageway 38.

Figure 4 also shows the bypass passageway 51 having the check valve 52, the purpose of which has been described.

Figure 5 shows two of the connections which are provided for connecting the small lines leading to the instruments into the main hydraulic flow which is carried by the passageways 34, 36, and 38. A horizontal passageway 73, extending from the front of the block 25 into the passageway 34, has a plug 74 to which the tube 39 is secured which leads to the snubber 41 for the pressure gauge 23 and from the snubber 41 to the gauge itself.

The block 25 also has a horizontally extending passageway 75 which extends from the front of the block above the passageway 73 into the outlet passage 38 and carries a plug 76 to which the tube 43 is secured to connect the snubber 48 and the downstream side of the gauge 22 to the main passageway 38.

Referring now to Figure 4, the block 25 has a plug 77 which opens into the bore 35a on the downstream side of the openings 56 in the valve 35. The tube 42 is secured to this plug 77 to connect the snubber 46 and the upstream side of the gauge 22 to the passageway 38.

It will be noted from Figures 4 and 5 that each of the plugs 74, 76, and 77 carry filter screens to clean fluid flowing through the tubes 39, 42, and 43 to the instruments. In Figures 4 and 5, filter screens are given the same numbers as they have been given in Figure 3, namely, 40 in plug 74, 47 in plug 76, and 45 in plug 77. It will also be noted from Figures 4 and 5 that the upstream side of these filter screens are all exposed to the main flow of fluid through the circuit tester, i.e., through the passageways 34, 36, and 38, and this main flow will have a tendency to remove from the surface of the screens dirt and foreign matter which has become trapped on the screens. The differential pressure gauge 22 is a conventional Bourdon tube type of differential pressure gauge in which fluids flows in and out of two opposed Bourdon tubes. There will thus be back flow through the filter screens which also tends to wash off the screen dirt and foreign particles which have been collected on the screen and force them back into the main flow of fluid through the instrument.

Figure 8:
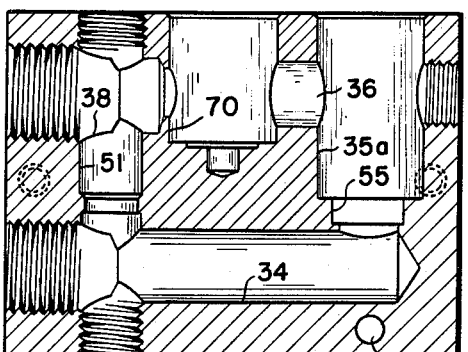
Figure 8 is a section along the lines VIII—VIII of Figure 6.
Figure 9:
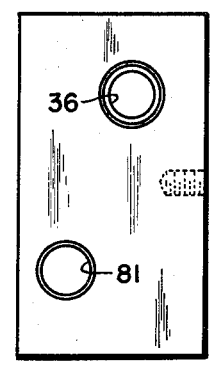
Figure 9 is a right-hand end view of the block shown in Figure 6.
Figure 10:
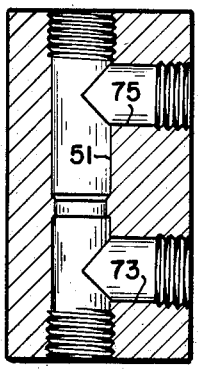
Figure 10 is a section along the lines X—X of Figure 6.
Figure 11:
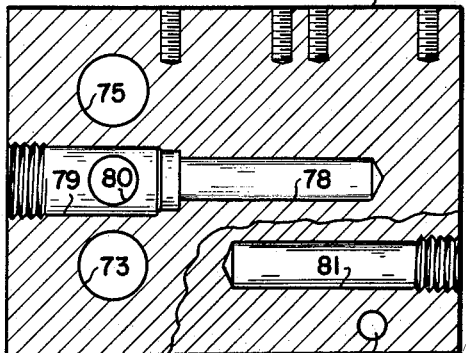
Figure 11 is a section along the lines XI—XI of Figure 6.

Figures 6 to 9, inclusive, show the block 25 without various operating components for purposes of clarity. Referring to Figure 8, it will be seen that the main passageways 34, 36, and 38 and the bores 35a and 70 form a U-shaped passage through the block and that there are various transverse passageways formed in the block to connect in the measuring instruments required. This arrangement provides a compact construction which is obviously important in a portable instrument.

Figure 12:
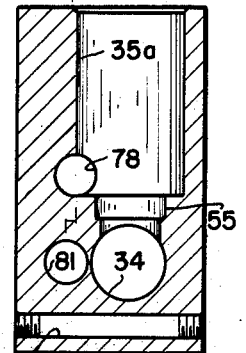
Figure 12 is a section along the lines XII—XII of Figure 6.
Figure 13:
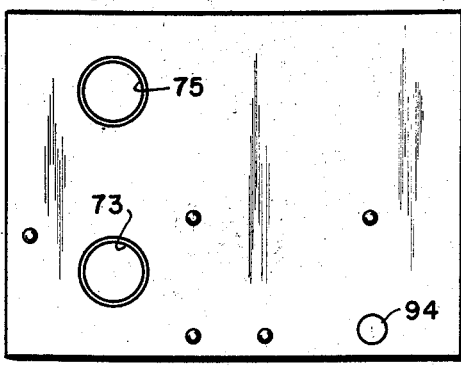
Figure 13 is a front elevation of the block shown in Figure 6.

Figures 10 to 13, inclusive, show how the relief valve 44 and the temperature gauge 24 are provided for. A bore 78 having an enlarged portion 79 is formed in the block from the same end as the passageways 34 and 38 and into the enlarged bore 79 a conventional cartridge-type relief valve 44 is threaded (see Figure 4). The relief valve 44 is connected across the orifice 37 by the bore 78 which, as shown in Figure 12, cuts into the bore 35a on the downstream side of the ports 56 in the loading valve 35 and by a short horizontal bore 80 which leads from the bore 79 to the passageway 51.

For the temperature gauge, another bore 81 is formed inwardly in the block 25 from the end of the block opposite that in which the passageways 34 and 38 are started. The bore 81 extends parallel to and is adjacent the bore 34, as appears in Figure 12. The temperature gauge bulb is fitted into the bore 81 and connected to the temperature gauge 24 in a conventional manner.

Figure 14:
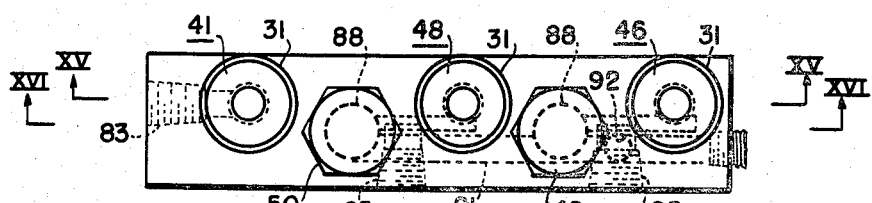
Figure 14 is a plan view of an auxiliary block used in our circuit tester for mounting additional components.
Figure 15:
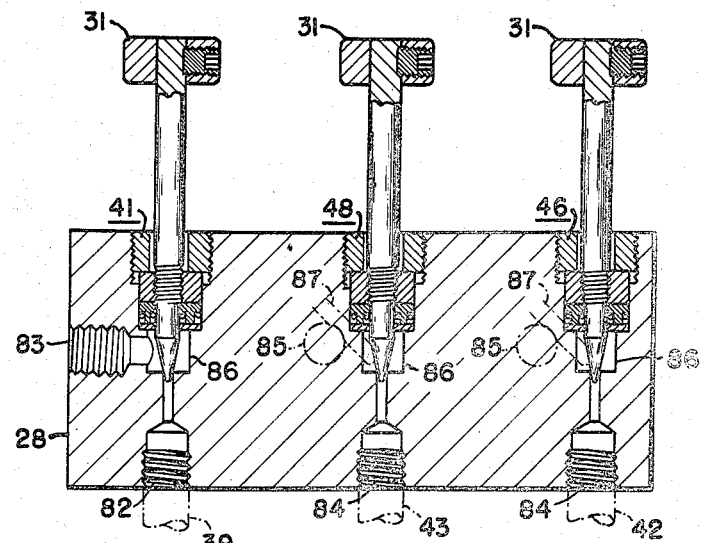
Figure 15 is a section along the lines XV—XV of Figure 14.
Figure 16:
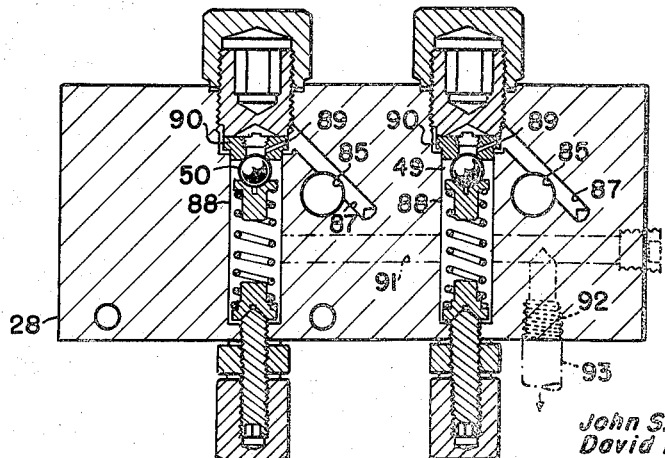
Figure 16 is a section along the lines XVI—XVI of Figure 14.

We provide the auxiliary block 28 for mounting the snubbers for the several gauges and the relief valves 49 and 50 and for connecting them together. By using a block separate from the main block 25, we are able to avoid extensive and complicated drilling which otherwise would be required if all components were mounted in one block. Figures 14 to 16, inclusive, show the arrangement of the snubbers and of the relief valves 49 and 50 in the block 28. In these figures, the snubbers and relief valves are designated by the same reference numbers as has been used in the description of Figure 3. As appears in Figures 14 to 16, the snubbers 41, 46, and 48 are conventional needle valves and the relief valves 49 and 50 are conventional spring-loaded relief valves which are adjustable.

Referring to Figure 15, the tube 39 leads from the filter screen 40 to the port 82 for the snubber 41 and the port 83 leads from the snubber 41 to the pressure gauge 23. Inlets for the snubbers 46 and 48 are provided by ports 84 to which the tube 42 for the snubber 46 and the tube 43 for the snubber 48 are connected. Outlets for the snubbers 46 and 48 are provided by two short horizontal bores 85 which are connected to needle chambers 86 of the snubbers by inclined bores 87 which extend diagonally from the bores 88 for the relief valves to the needle chambers 86 and which at the same time intersect the bores 85.

The bores 87 also connect the snubbers and the relief valves, there being an opening 89 in each seat 90 of the relief valves. If pressure builds up in the lines 42 and 43, therefore, the relief valves will open and fluid will flow through the bores 87 into the bores 88. A horizontal bore 91 is formed in the block 28 to connect the two bores 88 together. A short vertical bore 92 from the bottom of the block 28 intersects the bore 91. The bore 92 is threaded to receive a fitting for a tube 93 (see Figure 2) which leads to a bore 94 which is located near the bottom of the block 25 and extends from the front to the back of the block. As appears in Figure 2, the outer end of the bore 94 is closed by a plug 95 which holds the block 25 in the case 20 and which has a small bleed opening through which fluid may flow to atmosphere.

From the foregoing description, it is apparent that we have invented a portable circuit tester which provides a substantially unimpeded passage for the flow of fluid from a hydraulic component being tested back into the system in which the component is used. Only a very small portion of the fluid passes into the measuring instruments contained in the circuit tester. Therefore, it is not necessary to filter the greatest part of the fluid which passes through the test unit. The small amount of fluid which actually does pass to the measuring instruments can readily be filtered by conventional screen filters. These filters are located adjacent the main flow of fluid through the instrument and are cleaned by that flow. In addition, there is a back flow through the filter screens which tends to remove entrapped particles from the upstream sides of the screen and force them back into the main flow of fluid through the instrument.

A number of safety features are provided in our circuit tester. We have already mentioned the arrangement whereby the instrument is bypassed if an operator should connect an outlet from the hydraulic component being tested to the outlet connection of our instrument. The flow meter is provided with snubbers and relief valves on both the up and downstream sides. Because the volume of fluid which passes through these devices is so small, small snubbers and relief valves can be used. In the event that an operator misuses the instrument, the relief valves will open to atmosphere but, if the snubbers are set in their usual position, only a few drops of oil will flow out of the instrument.

It was explained that the loading valve which can be manually varied is spring loaded to stay open. This also is a safety feature. If a fixed valve were used and if an operator should set the fixed valve for a given pressure and volume and then, without changing the valve setting, attempt to test a device operating at a much higher volume, the resulting higher pressure might seriously damage the instrument.

Referring to Figure 1, it will be noted that the operating handle 26 for the loading valve extends at an angle to the side of the case. When the case is closed, the operating handle is pivoted about the stud 60 so as to bring the handle within the confines of the case and down against the cover 30. When the handle 26 is in this closed position, then the handle 27 of the variable orifice must lie in the position shown in Figure 1. The handle 27 is so placed on the shaft 72 that when the handle is in the position shown the orifice is set for its largest opening.

It should also be noted that the screen filters are located in a position where relatively little fluid flows through them. The result is that they are much less likely to clog than would be the case if a substantial volume of fluid passed through them.

While we have described a presently preferred embodiment of our invention, it is to be understood that it may be otherwise variously embodied within the scope of the appended claims.

We claim:

1. A portable hydraulic circuit tester having means forming a continuous passageway, said passageway having an inlet and an outlet at opposite ends thereof, said inlet and outlet being adapted to be connected to a circuit to be tested whereby fluid under pressure developed in the circuit flows through the tester and back to the circuit, said passageway also having a loading valve and an orifice assembly, means forming a second passageway in the tester, said second passageway having a small fluid capacity relative to the capacity of the first passageway, said second passageway connecting at its inlet end into the first passageway between the loading valve and the orifice and connecting at its outlet end to a differential pressure gauge, a third passageway also having a small fluid capacity relative to the capacity of the first passageway and having one end connected to said differential pressure gauge and the other end connected into said first passageway between the orifice and the outlet of the first passageway.

2. A hydraulic circuit tester as described in claim 1 and having a pressure gauge connected into said first passageway between the inlet and the loading valve.

3. A hydraulic circuit tester as described in claim 1 and having a temperature gauge connected into said first passageway between the orifice and the outlet.

4. A hydraulic circuit tester as described in claim 1 and having means forming a passage connecting into said first passageway adjacent said inlet and outlet and a check valve in the connecting passage, said check valve permitting fluid flow only from the outlet to the inlet.

5. A hydraulic circuit tester as described in claim 1 and having a relief valve connected into said second passageway across the orifice and across the differential pressure gauge.

6. A hydraulic circuit tester as described in claim 1 and having relief valves connected into said second passageway on each side of the differential pressure gauge, said relief valves opening to atmosphere.

7. A portable hydraulic circuit tester having means forming a continuous passageway, said passageway having an inlet and an outlet at opposite ends thereof, said inlet and outlet being adapted to be connected to a circuit to be tested whereby fluid under pressure developed in the circuit flows through the tester and back to the circuit, said passageway also having a loading valve and an orifice assembly, means forming a second passageway in the tester, said second passageway having a small fluid capacity relative to the capacity of the first passageway, said second passageway connecting at its inlet end into the first passageway between the loading valve and the orifice and connecting at its outlet end to a differential pressure gauge, a third passageway also having a small fluid capacity relative to the capacity of the first passageway and having one end connected to said differential pressure gauge and the other end connected into said first passageway between the orifice and the outlet of the first passageway, a relief valve connected into said second passageway across the differential gauge and said orifice, filter screens positioned in said second passageway adjacent the first passageway and on each side of the differential gauge, the upstream side of each screen being exposed to the flow of fluid through the first passageway, snubbers in said second passageway between the screens and the differential valve, and relief valves opening to atmosphere connected into said second passageway between the snubbers and said differential valve.

8. A valve and orifice assembly for a hydraulic circuit tester comprising means forming a continuous passageway, a loading valve and an orifice of predetermined size positioned in said passageway, and openings in the passageway adapted to receive conduits leading to instruments used in the tester, and filter screens in each opening and lying in a plane parallel to the axis of the passageway, the upstream side of each screen thereby being swept by the flow of fluid through the passageway.

9. A valve and orifice assembly for a hydraulic circuit tester comprising a block having a continuous U-shaped passageway formed therein, a loading valve and an orifice assembly positioned in said passageway, and openings in the block extending transversely from said passageway through the sides of the block and having means for connecting them to instruments used in the tester, and filter screens at each of said openings lying in a plane extending parallel to the flow of fluid through the passageway, the upstream side of each screen being exposed to the flow of fluid through the passageway whereby dirt collected on the screens is swept off by the flow of fluid through the passageway.

References Cited in the file of this patent

UNITED STATES PATENTS

| | | |
|---|---|---|
| 1,664,557 | Hannan | Apr. 3, 1928 |
| 2,020,432 | Parker | Nov. 12, 1935 |
| 2,073,243 | Lidell et al. | Mar. 9, 1937 |
| 2,450,922 | Snider | Oct. 12, 1948 |